United States Patent [19]

Schmidt

[11] 4,315,312
[45] Feb. 9, 1982

[54] CACHE MEMORY HAVING A VARIABLE DATA BLOCK SIZE

[75] Inventor: Carson T. Schmidt, Poway, Calif.

[73] Assignee: NCR Corporation, Dayton, Ohio

[21] Appl. No.: 105,186

[22] Filed: Dec. 19, 1979

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,764,996 | 10/1973 | Ross | 364/200 |
| 4,047,243 | 9/1977 | Dijkstra | 364/200 |
| 4,161,024 | 7/1979 | Joyce | 364/200 |
| 4,219,883 | 8/1980 | Kobayashi et al. | 365/189 |
| 4,234,934 | 11/1980 | Thersrud | 364/900 |

OTHER PUBLICATIONS

*Computer Organization,* Ivan Flores, Prentice-Hall Inc., Chapter 9, pp. 228-237, 1969.

*Primary Examiner*—Harvey E. Springborn
*Attorney, Agent, or Firm*—J. T. Cavender; Edward Dugas; Stephen F. Jewett

[57] ABSTRACT

A cache memory has a data buffer for storing blocks of data from a main memory and an index for storing main memory addresses associated with the data blocks in the data buffer. The size of the blocks of data stored in the data buffer can be varied in order to increase the "hit ratio" of the cache memory. The index is a set associative memory and bits provided to an address input of the index are selectively inhibited by an address inhibit circuit when the size of the data blocks in the data buffer is to be varied. A block size register stores block size information that is provided to the address inhibit circuit. The block size information is also provided to a fetch generate counter and a fetch return counter that control the number of words transferred as a block from the main memory to the cache memory.

8 Claims, 10 Drawing Figures

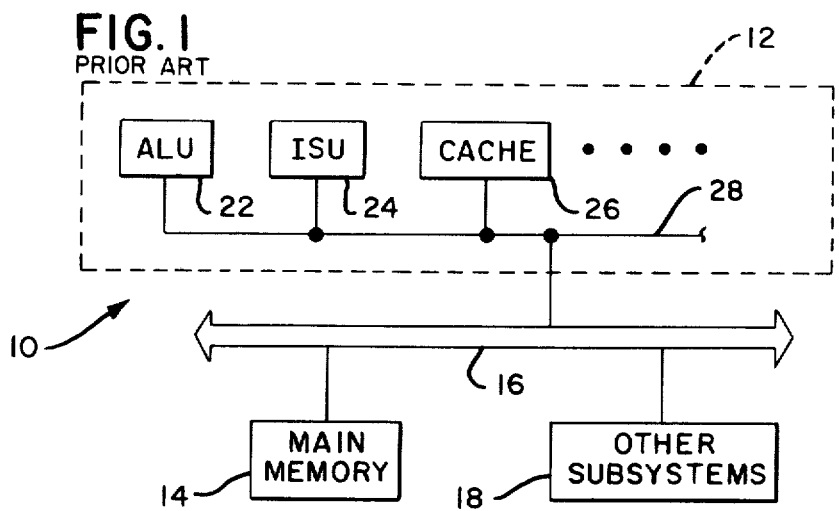
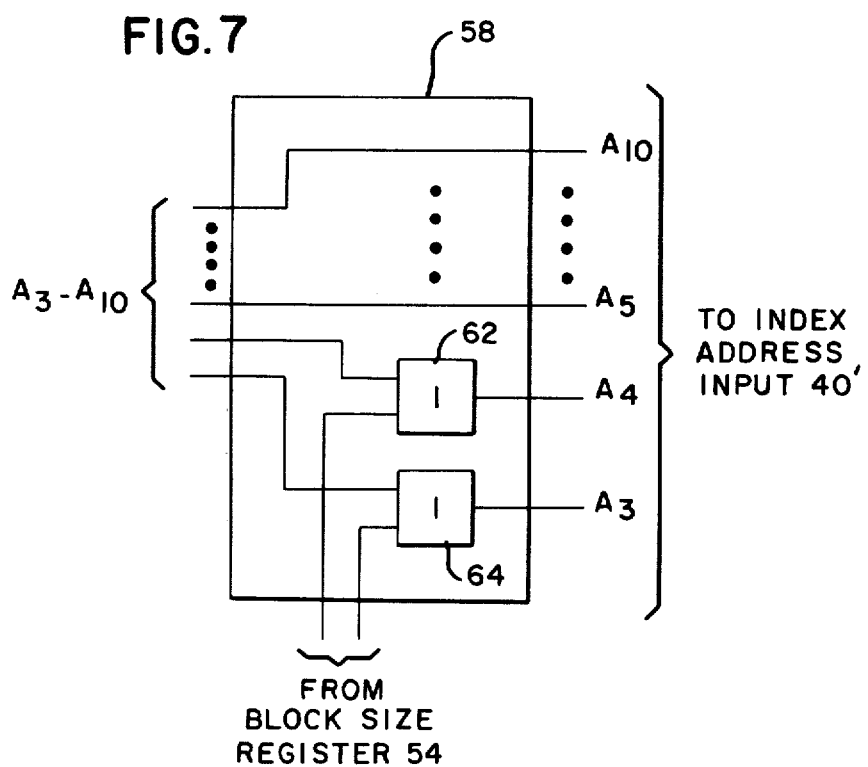

MAIN MEMORY
14 CONTENTS

INDEX
32 CONTENTS

DATA BUFFER
34 CONTENTS

CACHE MEMORY HAVING A VARIABLE DATA BLOCK SIZE

BACKGROUND OF THE INVENTION

The present invention relates to data processing systems and, more particularly, to cache memories used in data processing systems.

Cache memories are frequently used in data processing systems in order to increase the speed of such systems. A cache memory is essentially a data buffer or fast memory that quickly provides data in response to memory address signals. The cache memory generally resides within a processor and acts as an intermediate storage between the main memory of the system and the processing elements of the processor.

A processor often has its processing speed affected by the time that it takes to fetch data or instructions from the main memory. With a fast cache memory within the processor storing the most recently used data from main memory, the processor will, in most circumstances, be able to quickly get its needed data and instructions from the cache memory. In addition, since the cache memory resides within the processor, the data and instructions in the cache memory can be provided much more quickly than they could if they needed to be fetched along a bus from main memory.

There are a number of conditions that affect the likelihood of data being in the cache memory when needed by the processor. Data blocks that include words that have been recently used by the processor are much more likely to be needed by the processor than other blocks of data in the main memory. Accordingly, a least recently used (LRU) algorithm is often implemented in the processor for controlling the transfer of the blocks of data between the cache memory and the main memory. The LRU algorithm assures that only the most frequently used blocks of data are stored in the cache memory, and, if a block of data is needed that is not in the cache memory, the needed block replaces a block in the cache memory that is the least recently used. Even with the use of LRU algorithms, however, there are still some instances during the operation of the processor when the processor must wait for data from the main memory because of the need for a block of data not stored in the cache memory. This condition or circumstance is referred to as a "miss". During any given period of time, the number of "misses" in relation to the total number of cache memory accesses is referred to as the "hit ratio".

The type of task being performed also affects the likelihood of data being in the cache memory. For example, if the task involves the use of small clusters of data that are widely spread throughout the main memory, the processor may frequently have to access the main memory as each small cluster of data is needed.

Given these conditions, it is necessary that a data processing system have a cache memory that experiences a maximum hit ratio so that the processor in the system operates with maximum speed and efficiency.

SUMMARY OF THE INVENTION

In order to increase the hit ratio during the accessing of data from a cache memory, there is provided, in accordance with the present invention, a cache memory storing blocks of data that may be varied in size.

In the preferred embodiment of the invention described herein, there is provided a cache memory that includes a data buffer for storing blocks of data from the main memory of the system, with all of the data blocks being of the same predetermined size, and an index for storing address blocks associated with the blocks of data stored in the data buffer. The index is a "set associative" memory, that is, an associative memory capable of having its stored main memory addresses compared to main memory addresses provided at a data input of the associative memory, with the comparison made only with sets of stored main memory addresses selected by addressing inputs of the set associative memory. In order to vary the block size of the data stored in the data buffer, the number of address blocks stored in the index must be correspondingly varied. Accordingly, address inhibitor means is provided to inhibit certain of the addressing inputs of the index so that as the block size of the data in the data buffer is increased, fewer sets in the index are addressed.

It is, therefore, an object of the present invention to provide an improved data processing system.

It is another object of the present invention to provide an improved cache memory in a data processing system.

Still a further object of the present invention is to provide a cache memory in a data processing system for storing blocks of data that may be varied in size.

It is still another object of the present invention to provide a cache memory having a set associative index and having means for varying the number of blocks addressed in the set associative index.

These and other objects of the present invention will become more apparent when taken in conjunction with the attached drawings and the following description, wherein like reference numbers indicate like parts.

BRIEF DESCRIPTION OF THE DRAWINGS

FIG. 1 is a simplified block diagram of a conventional data processing system, including a processor having a cache memory.

FIG. 7 is a detailed block diagram of the address inhibit circuit shown in FIG. 4.

DESCRIPTION OF THE PREFERRED EMBODIMENT

Figure 2:
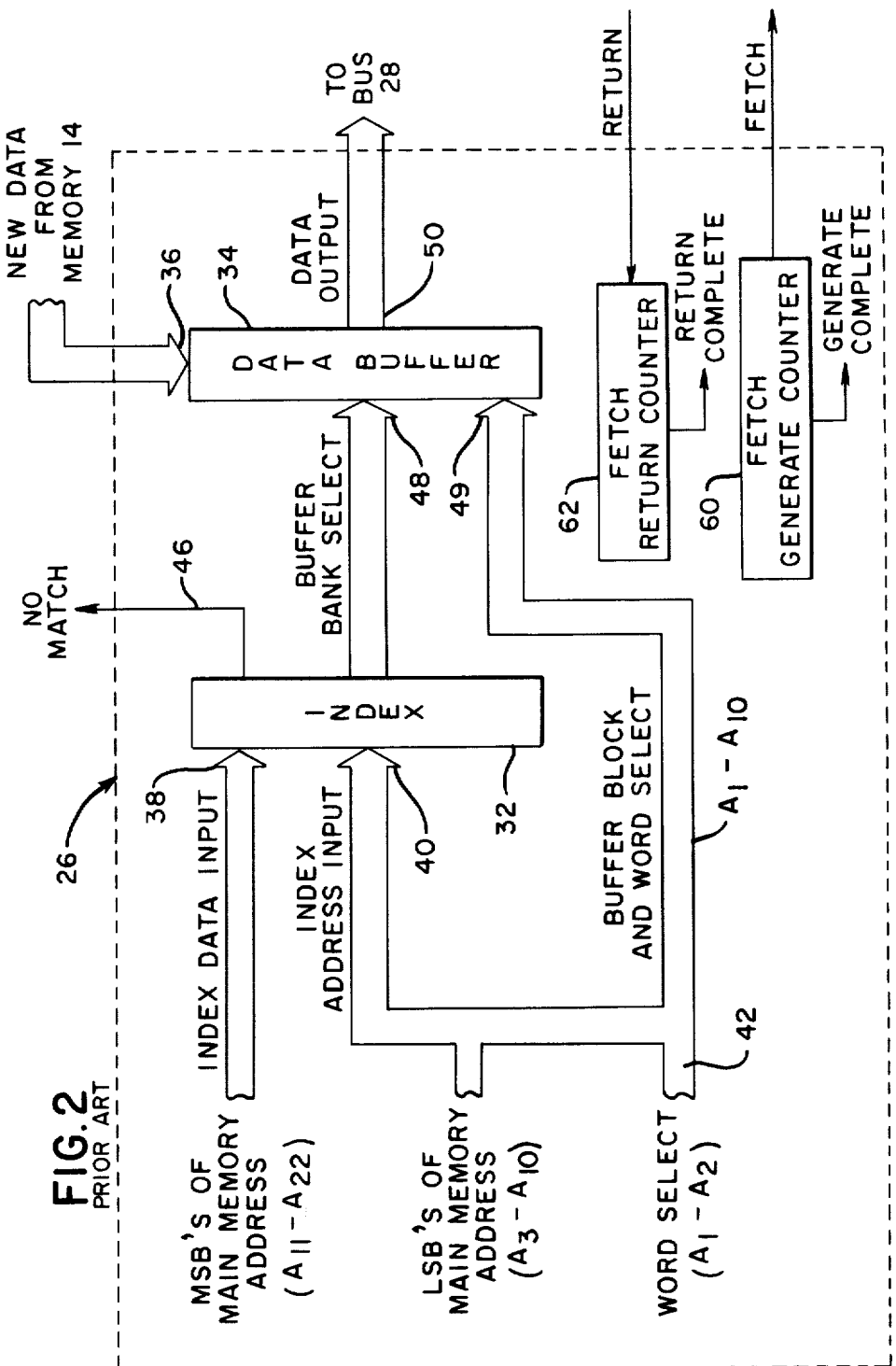
FIG. 2 is a block diagram illustrating the index and data buffer of a conventional cache memory, such as the cache memory illustrated in the data processing system of FIG. 1.

Turning first to FIG. 1, there is shown a data processing system 10, including a processor 12, a main memory 14, and an internal transfer bus 16 for connecting the processor 12 to the main memory 14. The bus 16 also connects other subsystems 18 to each of the main memory 14 and processor 12. As is conventional, the processor 12 can include an arithmetic-logic unit (ALU) 22, an instruction storage unit (ISU) 24, a cache memory 26, as well as other well-known and conventional components (not shown), all connected to each other and to the internal transfer bus 16 by a processor data bus 28.

The operation of a data processing system having a cache memory, such as data processing system 10 of FIG. 1, is well-known in the art. The main memory 14 normally holds data and instructions that are needed by the processor 12, such data and instructions initially loaded into the main memory by card readers, disk units, or other peripheral devices that might be found in the other subsystems 18. The data and instructions stored in main memory 14 are provided to the processor 12 over internal transfer bus 16. In response to each instruction from main memory 14, the ISU 24 will normally provide a microprogram for execution and, in accordance with microinstructions in that microprogram, data will be fetched from main memory 14 to be operated on by the ALU 22.

The data in the main memory 14 is organized in blocks, each block normally comprising a number of data words. When a specific word is needed from the main memory 14, the block in which it resides is stored in the cache memory 26. Since there is a likelihood that, when the processor accesses one word in a block and then subsequently needs a different word, the different word will be adjacent the first in the same block, the processor will in many cases only need to access the cache memory 26. In addition, the blocks of data held in the cache memory are stored in accordance with a least recently used (LRU) algorithm so that when the processor needs a new data word not in the cache memory 26, and a new block of data fetched from main memory 14 is to be stored in the cache memory 26, the block least recently used by the processor in the cache memory is removed and the new block of data is stored in its place. Processor hardware for implementing an LRU algorithm, including the transfer of data blocks between the main memory and cache memory, is well-known in the art. Commercially available systems having cache memories and using LRU algorithms include, among others, the Class 370/Model 168 system available from IBM Corporation, Armonk, N.Y.

Because the data needed by the ALU 22 will, in most cases, be stored in the cache memory 26, the data can be provided much more quickly to the ALU than if it were coming directly from main memory 14.

As illustrated in FIG. 2, the cache memory 26 is generally comprised of two memory components, an index 32 and a data buffer 34. The data buffer 34 stores the blocks of data from main memory 14, and the index 32 stores the main memory addresses associated with the data blocks in the data buffer 34. When the processor checks for a given data word in the cache memory 26, it checks the addresses stored in the index 32 and, if there is a match, the selected data word is read from the data buffer 34 to the bus 28 for use by the processor.

As conventional, the cache memory 26 further includes a fetch generate counter 60 and a fetch return counter 62. When a "miss" occurs, i.e., the data word sought by the processor is not stored in the data buffer 34, and the main memory 14 must transfer a new block having the data word to the cache memory, a FETCH signal is generated by the fetch generate counter 60 to cause each word of the block to be fetched from the main memory. A RETURN signal returns to the fetch return counter 62 when the data word is returned to the cache memory. The fetch generate and return counters 60 and 62 can be conventional binary counters of fixed size, depending on the size of the blocks of data stored in the cache memory. The fetch generate counter 60 decrements with each FETCH signal and the fetch return counter decrements with each RETURN signal. When the counters 60 and 62 decrement to zero, counter 60 provides a GENERATE COMPLETE signal and counter 62 provides a RETURN COMPLETE signal, indicating that the complete transfer of the data block has occurred. Each word of the new data block from main memory 14 is received at a data buffer data input 36 of the data buffer 34.

As mentioned earlier, the conventional processor hardware implementing the LRU algorithm determines which data block in data buffer 34 and corresponding address block in the index 32 are replaced when a new data block is needed in the cache memory 26. Such hardware generates the necessary control signals (not shown) to write the new block of data and corresponding address block in the cache memory.

In the cache memory 26 illustrated in FIG. 2, the index 32 is a "set associative" memory. As with any associative memory, the index 32 compares data (a main memory address) received at its data input 38 with its stored data in order to indicate a match. In addition, index 32 receives an address or index address input bits at its address input 40 so that only stored data in a set defined by the address at input 40 is compared with the data received at the data input 38.

Figure 3A:
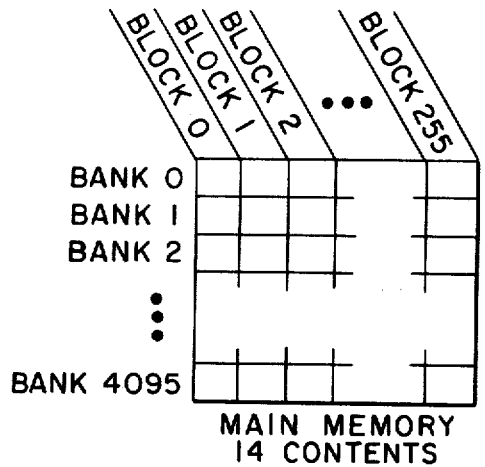
FIGS. 3A, 3B and 3C illustrate the contents of a main memory, and the contents of an index and data buffer of a conventional cache memory for storing blocks of data from the main memory, such as the cache memory of FIG. 2.
Figure 3B:
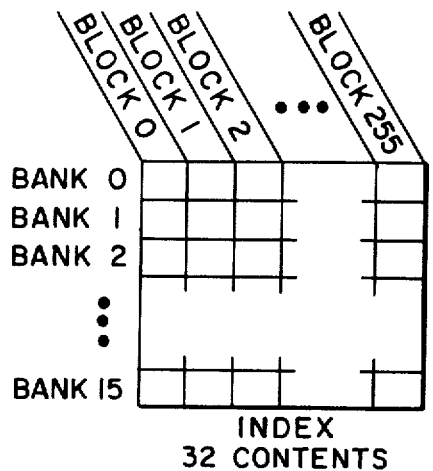
Figure 3C:
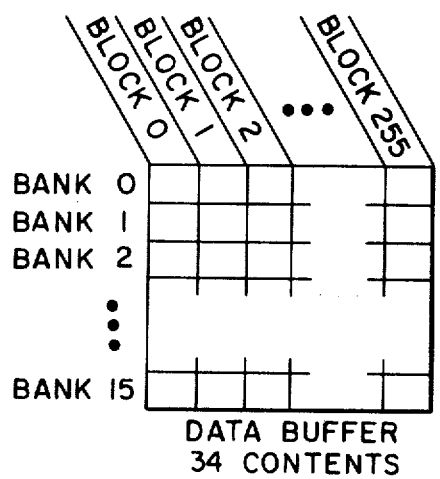

This can be more fully understood by referring to FIGS. 3A, 3B and 3C in conjunction with FIG. 2. FIG. 3A illustrates the contents of main memory 14, FIG. 3B illustrates the contents of index 32, and FIG. 3C illustrates the contents of data buffer 34. It is assumed for purposes of the present discussion that each main memory address has twenty-two bits. These include a first portion comprised of twelve of the most significant bits (MSB's) of the main memory address ($A_{11}$–$A_{22}$) received at the index data input 38, a second portion comprised of eight of the least significant bits (LSB's) of the main memory address ($A_3$–$A_{10}$) received at the index address input 40 and defining the "set" of data to which the bits at the data input 38 are to be compared, and two remaining bits ($A_1$–$A_2$) that are received at a word select input 42 of the cache memory, which will be described in greater detail later.

As seen in FIGS. 3A through 3C, each of the main memory 14, index 32 and data buffer 34 are arranged in banks (horizontal rows), with each bank having 256 blocks of data or main memory addresses (numbered "0" through "255" in vertical columns). There are 4,096 banks (numbered "0" through "4,095") in the main memory 14, and sixteen banks (numbered "0" through "15") in each of the index 32 and data buffer 34. Each vertical column of blocks seen in the index 32 in FIG. 3B is one of the sets that is defined by the eight bits of the main memory address ($A_3$–$A_{10}$) received at the index address input 40 of the index 32 in FIG. 2.

As mentioned above, the data buffer 34 stores blocks of data from the main memory 14, and each data block in the data buffer has a corresponding address block in the index 32. Each address block in index 32 stores the twelve most significant bits ($A_{11}$–$A_{22}$) of the main memory address of its corresponding data block. The eight least significant bits ($A_3$–$A_{10}$) of the main memory address of each data block determine the vertical column of blocks in which the address block and its corresponding data block will be located in the index 32 and data buffer 34.

When a new block of data from one of the vertical column of blocks in the main memory is to be written into data buffer 34, the new data block is put in the same vertical column of blocks in the data buffer where it resided in the main memory 14, and at the bank having the least recently used data block. The most significant bits of the main memory address of the new data block are placed in the corresponding address block in the index 32.

When the processor checks for a data block in the cache memory, one of the vertical columns of address blocks in the index is selected by the bits at the index address input 40 (FIG. 2), and each group of most significant bits of the main memory addresses stored in each of the sixteen address blocks in that column or set of the index 32 is compared to the most significant bits of the main memory address received at the index data input 38. If there is no match, then a signal at a no match output 46 of the index is delivered to the processor hardware implementing the LRU algorithm in order to bring into the cache memory the needed block of data. If there is a match, then a appropriate signal indicating the bank where the match occurred is generated by the index and is received at a buffer bank select input 48 of the data buffer 34. At the same time, the least significant bits ($A_3$-$A_{10}$) on the index address input 40 and the remaining two bits of the main memory address ($A_1$-$A_2$) on the word select input 42 are received at a block and word select input 49 of the data buffer 34 to select the appropriate vertical column of blocks in the data buffer and one of the words in the selected block. The resulting word appears at the buffer data output 50 and is provided to the processor data bus 28 for use by the processor.

The above is, of course, only a brief summary of the operation of a cache memory having an index which is set associative, such as the cache memory 26. This type of cache memory is well-known in the art, and for a more detailed discussion reference can be had to Performance Analysis of Cache Memories, by Gururaj S. Rao, 25 Journal of the Association for Computing Machinery 378 (July, 1978).

Figure 4:
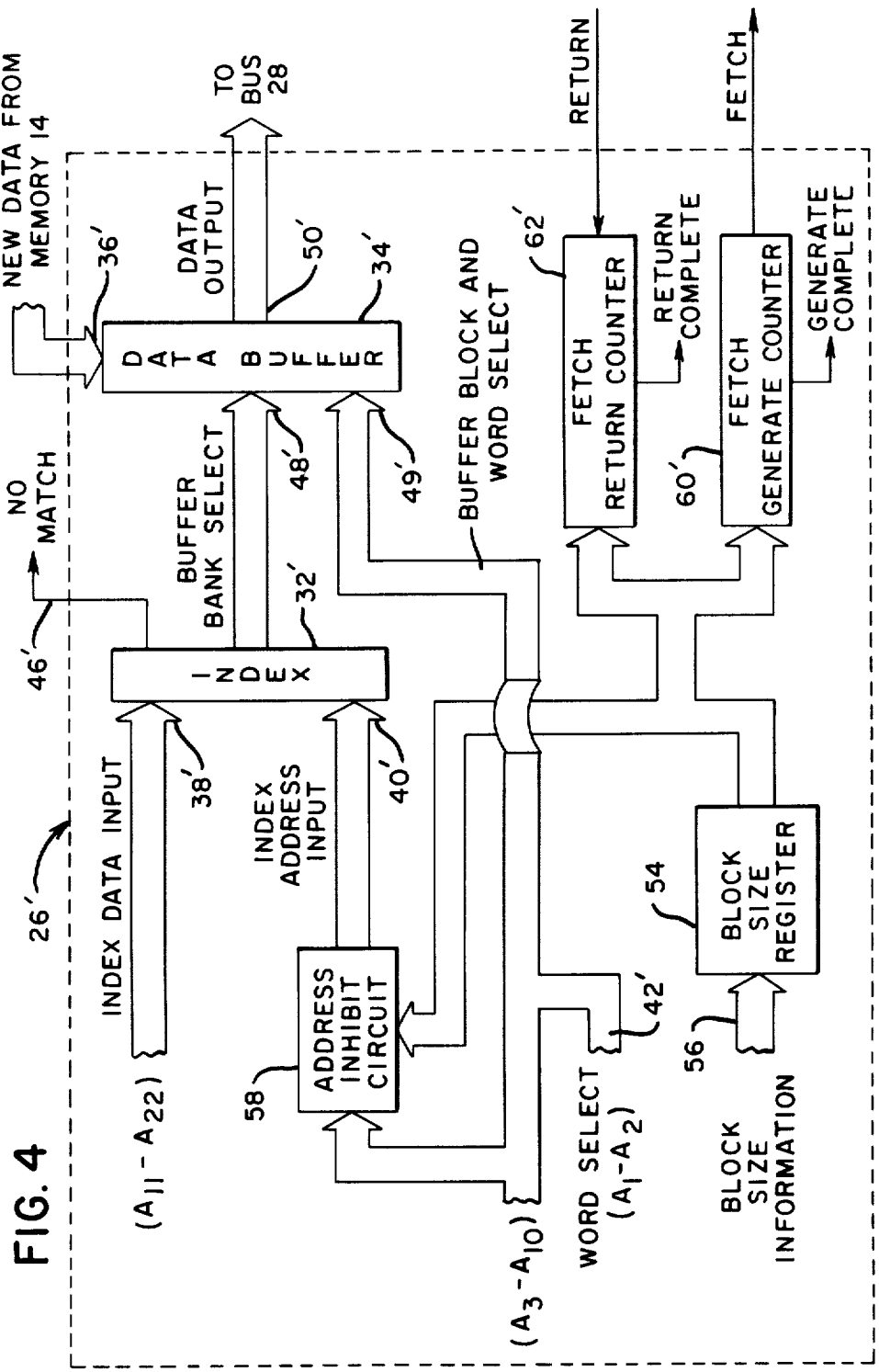
FIG. 4 is a block diagram of a cache memory, including an index and data buffer, having data blocks of variable size in accordance with the present invention.

In accordance with the present invention, there is provided in FIG. 4 a cache memory 26' for storing variable size blocks of data. Like the cache memory 26 of FIG. 2, the cache memory 26' has an index 32' and a data buffer 34'. The index 32' is a set associative memory and, still assuming twenty-two bit main memory addresses, has an index data input 38' for receiving the most significant main memory address bits ($A_{11}$-$A_{22}$) and an index address input 40' for receiving eight of the least significant main memory address bits ($A_3$-$A_{10}$). The index 32' provides bits to a buffer bank select input 48' of the data buffer 34' for selecting one of the banks in the data buffer 34' when a match occurs, and has a no match output 46' for providing a signal to the hardware implementing the LRU algorithm when the cache memory 26' does not have the data needed by the processor. The least significant main memory address bits ($A_3$-$A_{10}$) and the two remaining bits ($A_1$-$A_2$) on a word select input 42' are provided to a block and word select input 49' of the data buffer 34' in order to select a block and word, with the selected word appearing at a data buffer output 50'.

In order to control the size of the blocks of data stored in the cache memory 26' of FIG. 4, there is provided a block size register 54 for storing information or bits representing the block size desired for the cache memory. In the illustrated embodiment, the block size register 54 may be a conventional two bit binary register. The block size information in the block size register 54 comes from an input line 56 that may, in turn, originate either from manual switches set by an operator of the system, or that may be dynamically set by software or firmware.

The only drawback to software or firmware dynamically setting the block size is that each time there is a change in the block size, the cache memory must have all its previous blocks destroyed in preparation for the new size blocks. Accordingly, frequent changes in block size will increase the inefficiency of the system. As a result, one must be careful in changing the block size so that the desired increase in efficiency from changing the block size will not be offset by any decrease in efficiency caused by changing the block size at frequent intervals. It is anticipated that in the practice of this invention an operator of a data processing system will change the block size only a few times each day, at the most, depending upon the tasks that are being performed. It may be trial and error procedure, with the operator changing the block sizes for each task and noting any increase in operating speed. When the same task or a similar task is run in the future, the operator will set the block size register 54 to the most favorable block size information previously noted.

The block size information in the block size register 54 is provided to an address inhibit circuit 58, a fetch generate counter 60', and a fetch return counter 62'. The fetch generate counter 60' and fetch return counter 62' are provided with the block size information in order that the cache memory 26' fetches and receives the proper number of bytes or words from main memory when a new block of data is moved from the main memory to the cache memory. That is, the fetch generate counter 60' is provided with a binary value representing the block size, it decrements, and, as it decrements it issues a FETCH signal to the main memory to cause one word to be returned to the cache memory. When the counter 60' decrements to zero, it issues a GENERATE COMPLETE signal. The fetch return counter 62' is also provided with a binary value representing the block size and it decrements as each byte or word of the new block is returned from the main memory with a RETURN signal. When it decrements to a value of zero, it issues a RETURN COMPLETE signal, indicating the transfer of the new block of data to the cache memory has been completed. The words of the new data block are received at a data buffer data input 36'. When the block size information changes, the new block size information is provided into both the fetch generate counter 60' and the fetch return counter 62', and blocks of data having the new size are fetched and returned from the main memory. The fetch generate counter 60' and fetch return counter 62' may each be implemented by a conventional binary register/counter. If the largest block size is sixteen words per block, then counters 60' and 62' are each 4 bit counters.

The address inhibit circuit 58 affects the number of bits received at the address input 40' of the index 32'. As will be more fully described later, as the size of the data blocks in the data buffer 34' increases, fewer data blocks are stored in the data buffer 34', and less memory space (and fewer address blocks) is required in the index 32' for storing main memory address bits. With less memory space required in index 32', fewer of the bits ($A_3$–$A_{10}$) are required at the address input 40' to address the index.

Figure 5A:
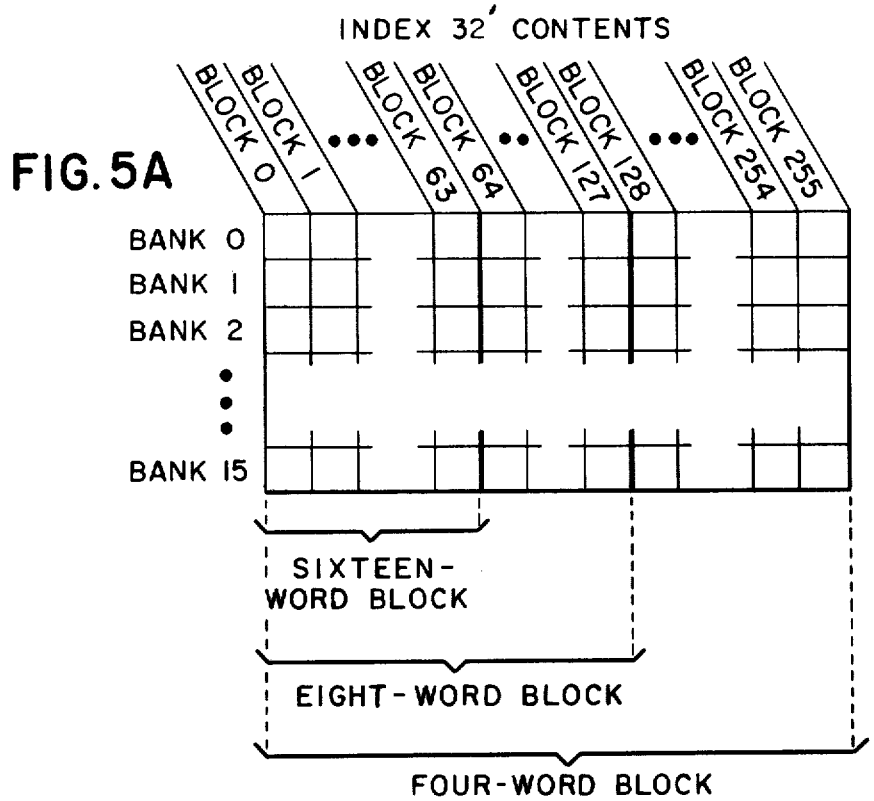
FIGS. 5A and 5B illustrate the contents of the index and data buffer of FIG. 4.
Figure 5B:
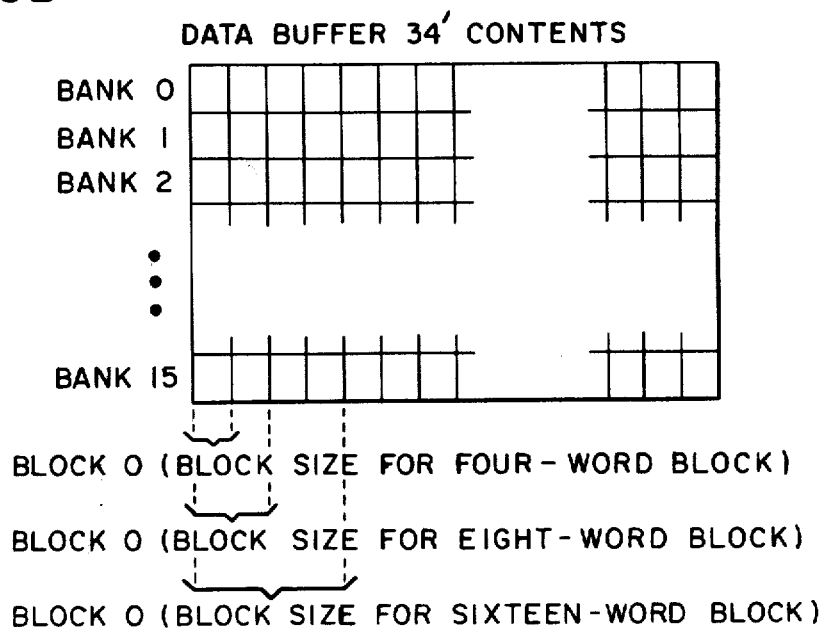

This is illustrated more clearly by FIGS. 5A and 5B, which show the contents of the index 32' and the data buffer 34', respectively. For purposes of the present description, it is assumed that the block sizes of data stored in the data buffer 34' may have any one of three sizes: 16 words per block, 8 words per block, or 4 words per block. As mentioned earlier, as the number of words or bytes per data block in the data buffer 34' increase, fewer blocks in the index 32' are required to store main memory address bits. Accordingly, as illustrated in FIG. 5A, for sixteen-word blocks in the data buffer 34', only one-fourth of the index 32' is needed and, accordingly, only BLOCKS 0–63 are loaded with the main memory address bits. For an eight-word block size, one-half of the index 32' is needed and, accordingly, only BLOCKS 0–127 are loaded with main memory address bits. For a four-word block size, the entire index 32' is needed, and BLOCKS 0–255 (all 256 blocks) of the index 32' are loaded with main memory address bits.

It should be apparent, of course, that in actual practice any size block can be chosen in accordance with the present invention. If block sizes smaller than four words per block are needed, then a larger index than the index 32' is required. The theoretical minimum size for the data blocks is, of course, one byte or word per block. If larger data block sizes are needed, then the index 32' can have a smaller portion used for addressing the blocks than that illustrated in FIG. 5A. The theoretical maximum size for the data blocks is, of course, a single block which would occupy the entire data buffer 34'.

Although the amount of memory space used in the index 32' decreases as the data block size increases, the data buffer 34' uses the same amount of memory space regardless of the block size. This is due, of course, to the fact that the number of words in each block increases as the number of blocks decreases. As is illustrated at the bottom of FIG. 5B for BLOCK 0 of data buffer 34', each block doubles when the block size changes from four words to eight words, and again doubles when the block size changes from eight words to sixteen words. Although the sizes of the blocks stored in data buffer 34' do change, the structure and operation of the data buffer 34' is no different from the single block size data buffer 34 of FIG. 2.

Figure 6:
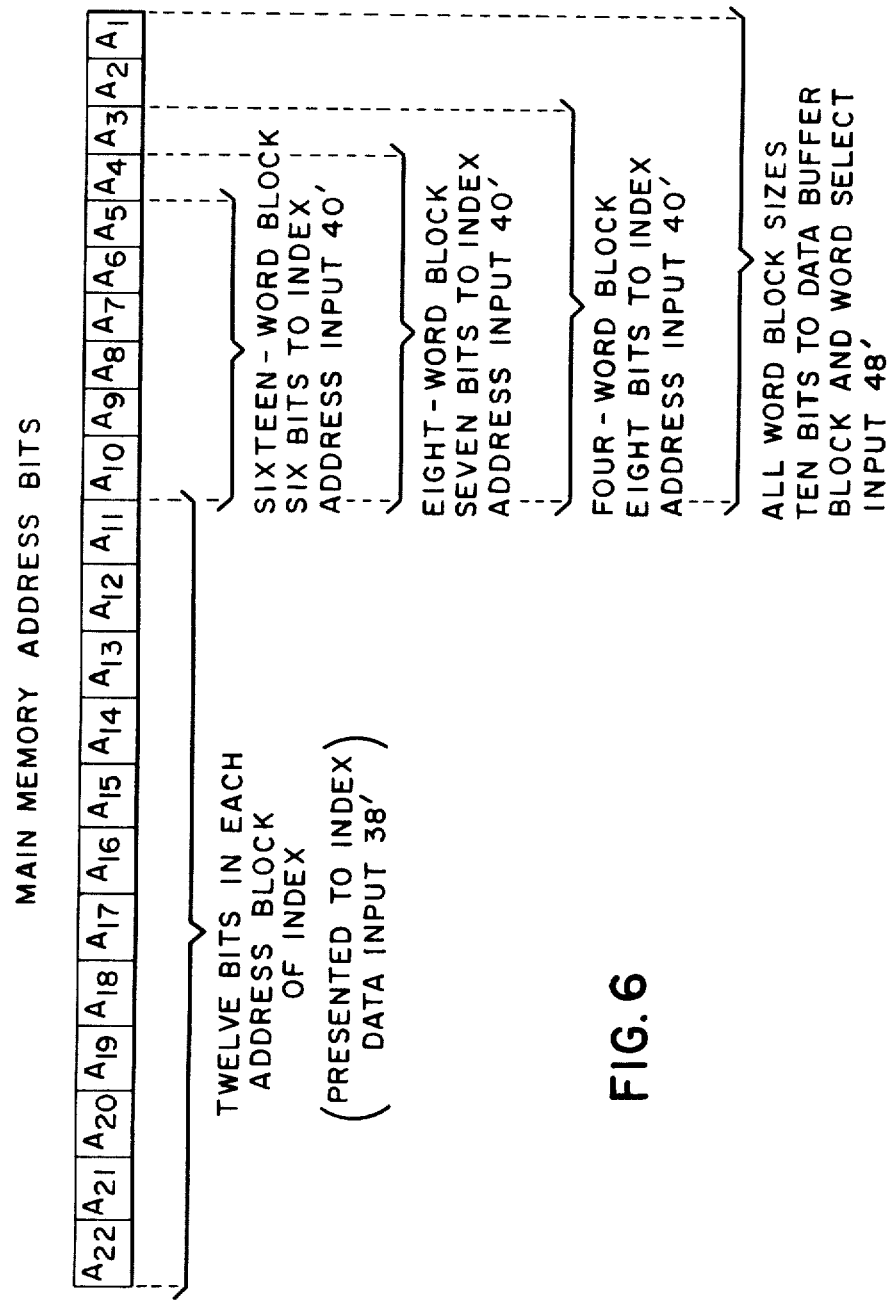
FIG. 6 illustrates the bits of a main memory address and their use in varying the block size of the cache memory shown in FIG. 4.

Still referring to FIGS. 5A and 5B, and also referring to FIG. 6, which illustrates the 22 bits of each main memory address, main memory address bits $A_{11}$–$A_{22}$ are stored in each address block in the index 32', regardless of the size of the data blocks stored in data buffer 34'. However, as the data block size increases, fewer bits are needed at the index address input 40' (FIG. 4), since there are fewer blocks in the index 32'. Since there are fewer data blocks in data buffer 34', but a larger number of words per block, the same number of bits ($A_1$–$A_{10}$) are needed, regardless of block size, at the data buffer block and word select input 49' to select the desired word in each block. As seen in FIG. 6, when each data block has four words, address bits $A_3$–$A_{10}$ are received at the index address input 40'. When each data block has eight words, address bits $A_4$–$A_{10}$ are received at the index address input 40'. Finally, when each data block has sixteen words, only address bits $A_5$–$A_{10}$ are received at the index address input 40'. For all three word block sizes, however, address bits $A_1$–$A_{10}$ are received at the data buffer block and word select input 49', since one word in the data buffer is selected to appear at the data buffer output 50', regardless of the block size and the resulting number of blocks in the data buffer 34'.

FIG. 7 illustrates the circuitry within the address inhibit circuit 58 of FIG. 4. As can be seen, the two lowest order bits ($A_3$ and $A_4$) of the bits provided to the index address input 40' are passed through OR gates 62 and 64. The remaining bits $A_5$–$A_{10}$ are passed directly through the address inhibit circuit 58 to the index address input 40'. The block size register 54 supplies two bits to the address inhibit circuit 58. If both bits supplied by the block size register 54 to the address inhibit circuit 58 are at "0", a four word block size is indicated, the bits $A_3$ and $A_4$, as well as bits $A_5$–$A_{10}$, are passed through to the index address input 40', and the entire index 32' (BLOCKS 0 through 255 in FIG. 5) is addressed. However, if an eight word block size is indicated, OR gate 64 receives a "1" from block size register 54. $A_3$ is held at a "1" logic level, so that only one-half of index 32' (BLOCKS 0 through 127 in FIG. 5) is addressed. If a sixteen word block size is indicated, both OR gates 62 and 64 receive a "1" from block size register 54, both $A_3$ and $A_4$ are held at a "1" level, and only one-fourth of the index 32' (BLOCKS 0 through 63 in FIG. 5) is addressed.

As should be apparent, the two bits from block size register 54 are provided to the two highest order bit locations in the fetch generate counter 60' and fetch return counter 62', in order to provide for the transfer of blocks having 4, 8 or 16 word block sizes.

It can be seen from the foregoing that by providing in a processor a conventional cache memory having a set associative index, a data buffer, and fetch generate and fetch return counters, and further providing in accordance with the present invention means for inhibiting certain address bits to the index, as well as changing the block size information supplied to the fetch generate and fetch return counters, the block size of the data in the cache memory can be varied. By varying the block size, The "hit ratio" of the cache memory can be increased, resulting in increased speed of the processor.

Although the presently preferred embodiment of this invention has been described, it will be understood that within the purview of this invention various changes may be made within the scope of the appended claims.

I claim:

1. In a data processing system having a main memory for storing data, a processor for processing data from said main memory, and a cache memory within said processor for storing data blocks, with all of the data blocks comprised of the same number of data words, the improvement wherein the number of data words in the data blocks may be varied and wherein said cache memory comprises:

a data buffer for receiving and storing data blocks from said main memory with the data blocks in data buffer arranged in banks with each bank having a plurality of data blocks;

a set associative index for storing an address block corresponding to each data block stored in said data buffer, each address block comprised of bits in the main memory address of the corresponding data block, said index including an index data input for receiving main memory address bits for comparison with the main memory address bits of the address blocks stored in said index, and an index address input for receiving index address input bits selecting a set of address blocks having the main memory address bits for comparison with the main memory address bits at said index data input; and inhibit means for inhibiting selected ones of the index address input bits at said index address input in order to reduce the number of addressable address blocks in said index so that the number of data words in the corresponding data blocks in said data buffer may be increased.

2. The data processing system of claim 1, wherein said cache memory further comprises a block size register for storing block size bits representing the size of the data blocks stored in said data buffer, and wherein said inhibit means includes logic gate means for receiving the index address input bits and the block size bits in order to hold selected ones of the index address input bits at a predetermined logic level during the receipt of the index address input bits at said index address input.

3. The data processing system of claim 2, wherein said cache memory further comprises:

a fetch generate counter for receiving the block size bits from said block size register and generating a FETCH signal in order to fetch from said main memory each data word in each data block to be stored in said data buffer; and a fetch return counter for receiving the block size bits from said block size register and receiving a RETURN signal from said main memory with each data word in each data block from said main memory;

said fetch generate counter decremented upon each FETCH signal and said fetch return counter decremented by each RETURN signal so that, when said data buffer receives and stores a complete data block from said main memory, said fetch generate counter and said fetch return counter have been decremented to a zero value.

4. A data processing system, comprising:

a main memory; and a processor for processing data stored in said main memory, including a cache memory, said cache memory comprising:

a data buffer for storing data blocks from said main memory, with all of the data blocks having the same size;

a set associative index for storing sets of address blocks, each address block having an associated one of the data blocks in said data buffer and comprised of bits representing a main memory address of its associated data block, said index including an index data input for receiving main memory address bits for comparison with the main memory address bits in the address blocks and an index address input for receiving index address input bits addressing a set of address blocks to be compared with the main memory address bits at said index data input; and means for varying the size of all of the data blocks that are to be stored in said data buffer, including means for inhibiting selected ones of the index address input bits in order to reduce the number of sets of address blocks stored in said index.

5. The data processing system of claim 4, wherein said cache memory further comprises a block size register for storing bits representing the size of the data blocks stored in said data buffer, and wherein said means for inhibiting comprises logic gate means for logically combining the index address input bits and the bits from said block size register in order to hold the selected ones of the index address input bits at a predetermined binary value in order to reduce the addressable size of said index.

6. The data processing system of claim 4, wherein said cache memory further comprises:

a block size register for storing bits representing the size of the data blocks stored in said data buffer;

a fetch generate counter connected for receiving the bits in said block size register and generating a FETCH signal in order to fetch from said main memory each data word of each data block to be stored in said data buffer; and a fetch return counter connected for receiving the bits in said block size register and receiving a RETURN signal upon the storing of each data word in said data buffer from said main memory;

said fetch generate counter decremented upon each FETCH signal and said fetch return counter decremented upon each RETURN signal so that said fetch generate counter and said fetch return counter are both decremented to a zero value when a complete data block is stored in said data buffer from said main memory.

7. A cache memory for storing data blocks of all the same size from a main memory of a data processing system and for varying that size, wherein each data block has a main memory address, the cache memory comprising:

a data buffer for storing the data blocks, the data blocks arranged in said data buffer in banks with each bank having a plurality of data blocks;

a set associative index for storing an address block associated with each data block in said data buffer, each address block comprised of a plurality of bits representing a main memory address of its associated data block, the address blocks arranged in banks with each bank having a plurality of address blocks, said index having an index data input for receiving a first portion of the main memory address bits for comparison with the bits in the address blocks and an index address input for receiving a second portion of the main memory address bits defining a set of address blocks for comparison with the first portion of the main memory address bits at said index data input, each set comprised of a corresponding address block from each of the banks, and an index output for providing a buffer bank select signal to the data buffer when the first portion of the main memory address bits at the index data input matches the bits in one of the address blocks of the set defined by the second portion of the main memory address bits at said index address input, the buffer bank select signal indicating the bank where the match occurred; and inhibit means for inhibiting selected ones of the second portion of the main memory address bits at said index address input in order to reduce the number of address blocks in the set defined by the second portion of the main memory address bits at said index address input;

said data buffer having a block and word select input for receiving the second portion of the main memory address bits without being inhibited and having a buffer bank select input for receiving the buffer bank select signal from the index output so that a data block of variable size may be selected from said data buffer.

8. A cache memory for storing a plurality of data blocks from a main memory of a data processing system, wherein all of the data blocks stored in said cache memory have a same first number of data words and wherein the first number may be varied so that all of the data blocks stored in said cache memory have a same second number of data words, said cache memory comprising:

a data buffer for storing the data blocks, said data blocks arranged in banks with each bank having a plurality of data blocks;

a set associative index for storing an address block associated with each data block in said data buffer, each address block including bits in the main memory address of its associated data block, said index having the address blocks arranged in banks with each bank having a plurality of address blocks, said index including:

an index data input for receiving a first portion of the main memory address of a data block to be read from said data buffer for comparison with the main memory address bits in the address blocks stored in said index;

an index address input for receiving a second portion of the main memory address of the data block to be read from said data buffer for selecting a set of address blocks for comparison with the first portion of the main memory address, each set comprised of a corresponding address block from each bank in said index; and an index output for providing a buffer bank select signal to said data buffer when the first portion of the main memory address bits match the main memory address bits in one of the address blocks of the set defined by the second portion of the main memory address at said index address input, said buffer bank select signal causing the data block to be read from said data buffer;

a block size register for storing bits representing the block size of the data blocks to be stored in said data buffer;

inhibit means for receiving the bits in said block size register and inhibiting selected ones of the bits in the second portion of said main memory address in order to decrease the number of blocks in said index as the size of the data blocks in said data buffer increases; and fetch counter means for controlling the transfer of the data words in each data block from said main memory to said data buffer, said fetch counter means receiving the bits in said block size register so that the number of data words in each data block transferred may be varied.

* * * * *